United States Patent
Rang et al.

(10) Patent No.: US 7,725,553 B2
(45) Date of Patent: May 25, 2010

(54) MIXED MASSAGING MODE FOR MULTIPLE POINTS OF PRESENCE

(75) Inventors: Timothy J. Rang, Issaquah, WA (US); Orit Levin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1107 days.

(21) Appl. No.: 10/990,031

(22) Filed: Nov. 16, 2004

(65) Prior Publication Data

US 2006/0095522 A1 May 4, 2006

(51) Int. Cl.
G06F 15/16 (2006.01)
(52) U.S. Cl. .............. 709/207; 709/204; 709/227; 709/228
(58) Field of Classification Search ............... 709/207, 709/227

See application file for complete search history.

(56) References Cited

FOREIGN PATENT DOCUMENTS

| EP | 1 331 786 | 7/2003 |
| EP | 1331786 A1 * | 7/2003 |

OTHER PUBLICATIONS

Instant Message Sessions in SIMPLE, B. Campbell and J. Rosenberg. Oct. 25, 2002. Retrieved from <http://www.jdrosen.net/papers/draft-campbell-simple-im-sessions-00.txt> on Apr. 7, 2008.*
B. Campbell, J. Rosenberg, H. Schulzrinne, C. Huitema, D. Gurle, Session Initiation Protocol (SIP) Extension for Instant Messaging, Dec. 2002, pp. 1-7.*
Campbell, B., and Rosenberg, J., Dynamicsoft, "Instant Message Sessions in SIMPLE," IETF Standard—Working—Draft, Internet Engineering Task Force, IETF, Oct. 25, 2002.
Rosenberg, J., Dynamicsoft, Advanced Instant Messaging Requirements for the Session Initiation Protocol (SIP), IETF Standard-Working-Draft, Internet Engineering Task Force, IETF, Feb. 12, 2004.
Campbell, B. et al., "Session Initiation Protocol (SIP) Extension for Instant Messaging," Network Working Group, Request for Comments: 3428, Dec. 1, 2002.
European Search Report for European Patent Application No. 05109796.2, Microsoft Corporation, Mar. 21, 2006.

* cited by examiner

*Primary Examiner*—Vivek Srivastava
*Assistant Examiner*—Ryan J Jakovac
(74) *Attorney, Agent, or Firm*—Perkins Coie LLP

(57) ABSTRACT

A facility for providing an IM mixed mode operation by utilizing both page mode IM and session based IM jointly in the same IM conversation is provided. The facility initiates an IM conversation between an originating user registered at an originating device and a remote user registered at a plurality of devices initially in page mode. Subsequent to discovering the identity of a remote device used by the remote user to initially reply to the IM conversation, the facility converts the IM conversation from page mode IM to session based IM.

16 Claims, 4 Drawing Sheets

Computer System 100

- 102 CPU
- 104 Memory
- 106 Persistent Storage
- 108 Computer-Readable Media Drive
- 110 Network Connection

*FIG. 1*

MIXED MASSAGING MODE FOR MULTIPLE POINTS OF PRESENCE

TECHNICAL FIELD

The described technology is directed generally to communication between devices over a computer network and, more particularly, to providing an improved instant messaging user experience.

BACKGROUND

Two instant messaging (IM) models currently exist—session based and page mode. Session based IM requires that a dialogue be established between two endpoints prior to the transmission of messages. If an IM service permits a user to be logged into only a single client—e.g., endpoint—at any one time, a session can be established "under the covers" without any required interaction with or involvement of the user. A major drawback to pure session based IM is that, while suitable for endpoint-to-endpoint IM, it does not work when a user is logged into multiple client endpoints. Stated another way, any IM service that allows users to log into multiple client endpoints at once cannot be based on pure session based IM.

For example, if a session based IM service permits a user to log into multiple endpoints at once, then a target endpoint for that user must be selected when the session is initiated. The target endpoint can either be selected by the network or the user. If the network selects the endpoint, there is no way to guarantee that the selected endpoint is the appropriate endpoint—e.g., the endpoint at which the user is located. If the user selects the endpoint, then either the user is required to set complex rules for IM routing that reside in the network, or the session invitation must be sent to all endpoints, and the user must actively "Accept" the IM session. This is similar to the experience of phone users who must accept a call before a voice session can begin.

The active acceptance requirement of an IM session is counterintuitive and results in a loss of several highly desired user experiences. One desired user experience is that IM users expect to receive messages without having to acknowledge the received messages. Additionally, IM users expect to be able to receive multiple messages without having to actively participate in the session. For example, the user could be away or just choose to not reply at that moment and still expect that the other party be able to send IMs at will. A drawback with requiring the active acceptance of an IM session is that, if a user is away or is not able to acknowledge, the free flow of IM that users typically expect, and have become accustomed to, is not possible.

An alternative to session based IM is IM page mode where all messages are delivered to all registered endpoints. Therefore, with IM page mode, a user is allowed to be logged into multiple endpoints. But, support of multiple registered endpoints has several drawbacks. First, as discussed above, the desirable properties provided by session based messaging are not available because of the support of multiple endpoints. Second, the user experience is poor as one endpoint will be engaged in a 2-way IM session and all other endpoints will simply reflect the list of incoming messages because all the messages that the user receives are always delivered to all of the user's endpoints.

Accordingly, an IM model that supports multiple user endpoints while providing the user experience associated with session based IM will have significant utility.

BRIEF DESCRIPTION OF THE DRAWINGS

FIG. 1 is a block diagram illustrating selected components typically incorporated in at least some of the computer systems on which the facility executes.

DETAILED DESCRIPTION

Figure 2:
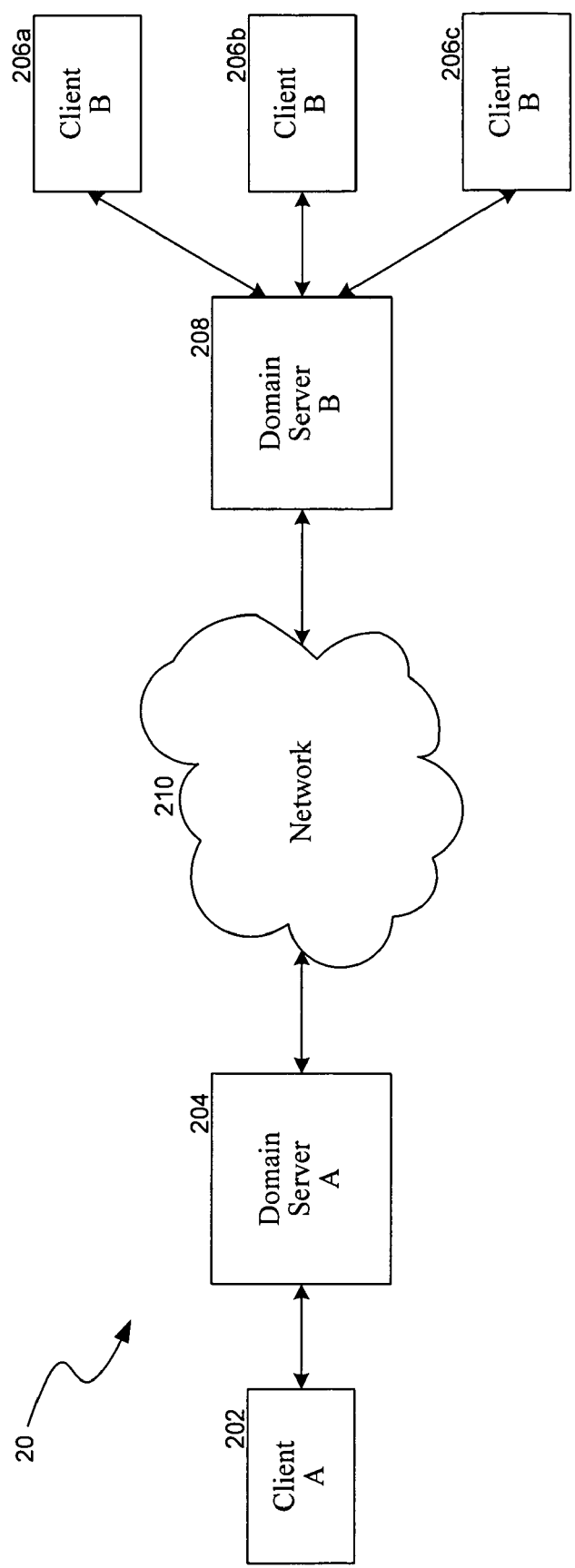
FIG. 2 is a high-level block diagram showing an environment in which the facility operates.

An IM model that provides an enriched user experience typically associated with session based IM while supporting multiple user devices or endpoints is described. A software facility ("facility") provides a protocol for an IM mixed mode operation by utilizing both page mode IM and session based IM jointly in the same IM conversation to provide an improved user IM experience. The facility initiates an IM connectivity initially in page mode. Subsequently, when a device identifier—either an originating user's device identifier or a remote user's device identifier or both—is known, the facility converts the page mode IM conversation to a session based IM conversation.

In some embodiments, the facility utilizes page mode messaging to establish initial connectivity to a plurality of remote user's devices, followed by a session initiated by one of the plurality of remote user's devices. For example, there may be multiple instances of the remote user—e.g., the remote user may be registered with an IM service at multiple devices or endpoints. In order to account for the multiple remote user devices, the facility initiates the IM connectivity in page mode, and identifies an originating device—i.e., a device or endpoint utilized by an originating user to request an IM session with a remote user—in the page mode message that is used to establish the page mode IM conversation with a remote user. The page mode message is delivered to each of the remote user's registered devices. The facility may transmit zero, one or more subsequent page mode messages as requested by the originating user, which are also delivered to each of the remote user's registered devices. Subsequently, when the remote user replies to the page mode IM conversation at or using one of the remote user's registered devices, the facility, at the registered device utilized by the remote user to reply to the page mode IM conversation, uses the originating device identifier as a target of a session based IM conversation. By allowing the remote user's reply to initiate the session based IM, the originating user's device and the remote user's device effectively discover each other, and once this is done, the IM conversation is converted from its initial page mode to a session based IM conversation. Once the session is established back to the originating user's device, a subsequent signal or indication is sent to each of the remote user's registered devices to indicate that a session based IM conversation has been established with one of the remote user's registered devices—i.e., the registered device used by the remote user to reply to the previous page mode IM conversation.

In other embodiments, the facility does not identify an originating device—i.e., a device or endpoint utilized by an originating user to request an IM session with a remote user—in the page mode message that used to establish the page mode IM conversation with a remote user. In this instance, when the remote user replies to the page mode IM conversation at or using one of the remote user's registered devices, the facility, at the registered device utilized by the remote user to reply to the page mode IM conversation, sends an identifier for the particular remote user's registered device to the originating device. In this manner the originating device effectively discovers the registered device at which the remote user is at—i.e., the registered device that is being utilized by the remote user to reply to the IM conversation, and uses the remote user's registered device identifier as a target of a session based IM conversation.

The various embodiments of the facility and its advantages are best understood by referring to FIGS. 1-4 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which the facility executes. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data-including data structures.

The facility may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the facility.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the facility, it will be appreciated that the facility may be implemented using devices of various types and configurations, and having various components.

In the discussion that follows, embodiments of facility are described in conjunction with a variety of illustrative examples. It will be appreciated that the embodiments of facility may be used in circumstances that diverge significantly from these examples in various respects.

FIG. 2 is a high-level block diagram showing an environment 20 in which the facility may operate. As depicted, environment 20 comprises several client computer systems, such as a client A 202 and clients B 206*a-c*. Each of the client computer systems has an application program, such as a user interface program, for enabling its user to conduct IM with another user. The client computer systems are coupled to a respective domain server hosting the facility. As illustrated, client A 202 is coupled to a domain server A 204, and each of clients B 206*a-c* are coupled to a domain server B 208. The domain servers are further coupled to each other via a network 210, such as the Internet.

The client computer system may be any type of computer or communication device that provides a user the ability to conduct IM. By way of example, the client computer system may be a personal computer running a suitable operating system program that supports the loading and executing of an IM application program. Alternatively, the client computer system may be a network appliance, such as a personal digital assistant, or other suitable communication device, such as a cellular telephone, suitable for use in conducting IM. As such, the client computer system functions as a device that is used by a user to conduct IM. Stated another way, the client computer system serves as an endpoint for an instance of a user registered with the IM service.

In general terms, the domain server comprises one or more computer systems that collectively functions as a server for a particular network domain, such as an Internet domain. As depicted in FIG. 1, domain server A 204 provides the domain services for client A 202, and domain server B 208 provides the domain services for clients B 206*a-c*. In some embodiments, the domain servers host the facility, and facilitates the mixed mode IM as described herein. It will be appreciated that all or parts of the facility may also be hosted by other computing systems, such as the client computing systems, for example, in an environment where the client computing system also provides some or all of the domain server functionality.

Network 210 facilitates the transfer of electronic content between, for example, the attached computers. In some embodiments, network 210 includes the Internet. The Internet is a global network connecting millions of computers. The structure of the Internet, which is well known to those of ordinary skill in the art, is a global network of computer networks and utilizes a simple, standard common addressing system and communications protocol called Transmission Control Protocol/Internet Protocol (TCP/IP).

It will be appreciated that network 210 may be comprised of one or more other types of networks. By way of example, network 210 can include local area networks (LANs), wide area networks (WANs), metropolitan area networks (MANs), public internets, private intranets, a private computer network, a secure internet, a private network, a public network, a value-added network, interactive television networks, wireless networks, two-way cable networks, interactive kiosk networks, and the like. It will also be appreciated that the client computer systems may be directly coupled to its domain server or via any one or a combination of the aforementioned types of networks, including network 210.

Figure 3:
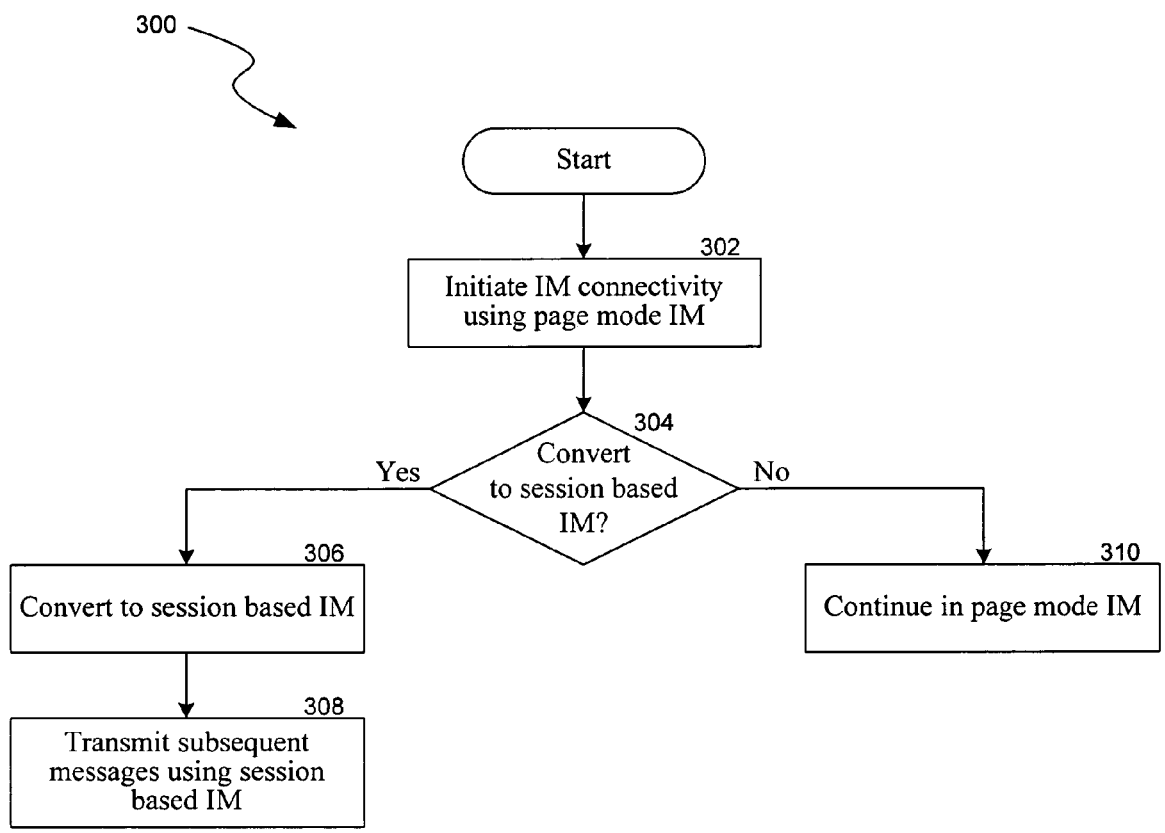
FIG. 3 illustrates a flow chart of a method by which an IM mixed mode operation is provided in an IM conversation, according to some embodiments.

FIG. 3 illustrates a flow chart of a method 300 by which an IM mixed mode operation is provided in an IM conversation, according to some embodiments. By way of example, a remote user, User B, may be logged on to an IM service using multiple devices. With reference to FIG. 2, domain server B 208 may provide the IM service, and User B may be simultaneously registered with the IM service using client 206*a* (e.g., a desktop computer), client 206*b* (e.g., a laptop computer), and client 206*c* (e.g., a PDA). During a start step, a user wanting to originate an IM conversation (e.g., chat session) with User B may use client A 202 (e.g., a desktop computer) to register with an IM service provided, for example, on domain server A 204. User A can then compose an IM text message using client A 202 and invoke a command to transmit the IM text message to User B, causing client A 202 to send the IM text message addressed to User B to User A's domain server A 204.

Returning to FIG. 3, at step 302, User A's domain server A 204 initiates IM connectivity for the requested IM conversation with User B using page mode IM. Here, the facility, for example, executing on User A's domain server A 204, does not know which of User B's currently registered devices to target the IM conversation to, and, therefore, the facility initiates the IM connectivity in page mode. In page mode, the facility transmits the IM text message targeting User B in general, using User B's address of record and does not specify a particular endpoint of User B—i.e., a particular registered device. The IM text message is transmitted over network 210 to User B's domain server B 208. In one embodiment, the facility also transmits a device identifier of the sender of the IM text message—e.g., the identifier for client A 202.

User B's domain server B 208 receives the IM text message targeting User B and forks the IM text message to each instance of User B, causing each of User B's registered devices—i.e., clients B 206a-c—to receive the IM text message. Each of these devices may respond to the receipt of the IM text message by, for example, instantiating a window on a coupled display device and displaying the IM text or otherwise by providing an indication of the receipt of the IM text message. Each of the devices may also provide a response indicating the successful receipt of the IM text message to the coupled domain server—i.e., User B's domain server B 208. User B's domain server B 208 may then aggregate the responses received from User B's registered devices and send a single response back to User A's domain server A 204.

User A may compose additional IM text messages as part of the IM conversation with User B without having User B respond to the IM conversation. In this instance, User A's domain server A 204 transmits any additional IM text messages using the page mode IM that was initially established for this IM conversation, causing the additional IM text messages to be received by each of User B's registered devices as described above.

At step 304, a determination is made as to whether the IM conversation currently in page mode is to be converted to a session based IM. In some embodiments, an initial reply to an IM conversation in page mode serves as a trigger that converts the IM conversation to a session based IM. Continuing the above example, User B may respond to the IM conversation by composing a reply IM text message to User A using User B's laptop computer—i.e., client B 206. At step 306, client B 206 converts the IM conversation from page mode to session based by transmitting to User A's device, client A 202, which was previously identified to client B 206, a request to establish or convert the current IM conversation to a session based IM. Client B 206 may include its identifier in the request transmitted to client A 202. The request to convert the IM conversation to a session based IM is transmitted to client A 202 via User B's domain server B 208, network 210 and User A's domain server A 204.

In response, client A 202 affirmatively responds to the received request to convert the IM conversation to a session based IM, which causes a session based IM to be established between client A 202 and client B 206. In some embodiments, client A 202 may transmit an indication (e.g., a message) to all of User B's registered devices that a session based IM has been established with a particular one of User B's registered devices—i.e., client B 206b. Client A 202 may transmit this indication or message as a page mode IM message, causing it to be received by all of User B's registered devices.

User B's registered devices receive the indication and, the registered devices other than the one with whom the session based IM is established—i.e., Client A 202—provide some type of indication that the previously received text messages in the IM conversation are no longer valid. For example, User B's registered devices with whom the session based IM is not established may remove the window displaying the previously received IM text messages, provide an indication that the IM conversation is no longer active, provide and indication that the previously received text messages in IM conversation have expired or are no longer valid, provide an indication that User B has replied to the IM conversation using anther registered device, and the like.

At step 308, subsequent text messages in the IM conversation between User A and User B are transmitted in the session based IM. Stated another way, subsequent text messages between User A using client A 202 and User B using client B 206b are transmitted via the session that was established (at step 306) between these endpoints.

If, at step 304, a determination is made to not convert the IM conversation from page mode to session based, then at step 310, the IM conversation continues in page mode. In this instance, subsequent text messages in the IM conversation between User A and User B are transmitted in page mode IM. Continuing the above example, User B may not reply to the IM conversation and, thus, the IM conversation will continue in page mode, and subsequent IM text messages from User A continue to be delivered to each of User B's registered devices.

In some embodiments, the IM service provided on User B's registered devices and/or User B's domain server B 208 may not support session based IM. In these embodiments, the IM conversation continues in page mode, even in instances where User B replies to the IM conversation using on of the registered devices. Thus, in a manner similar to the above illustrated instance where User B does not provide a reply, subsequent text messages in the IM conversation are delivered to all of the registered devices, both for User A and for User B.

In another embodiment, the IM text messages from User A may not include an indication of the device on which the text messages originated. In the above example, the facility may not transmit a device identifier of the sender of the IM text message—e.g., the identifier for client A 202. In this instance, User B may respond to the IM conversation by composing a reply IM text message to User A using User B's laptop computer—i.e., client B 206. Client B 206 may transmit to User A an indication of the reply and an identifier of the registered device that User B used to provide the reply—i.e., client B 206. The reply is transmitted to client A 202 via User B's domain server B 208, network 210 and User A's domain server A 204. Subsequently, client A 202 may transmit to client B 206, which was previously identified to client A 202, a request to establish or convert the current IM conversation to a session based IM.

Those of ordinary skill in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 4:
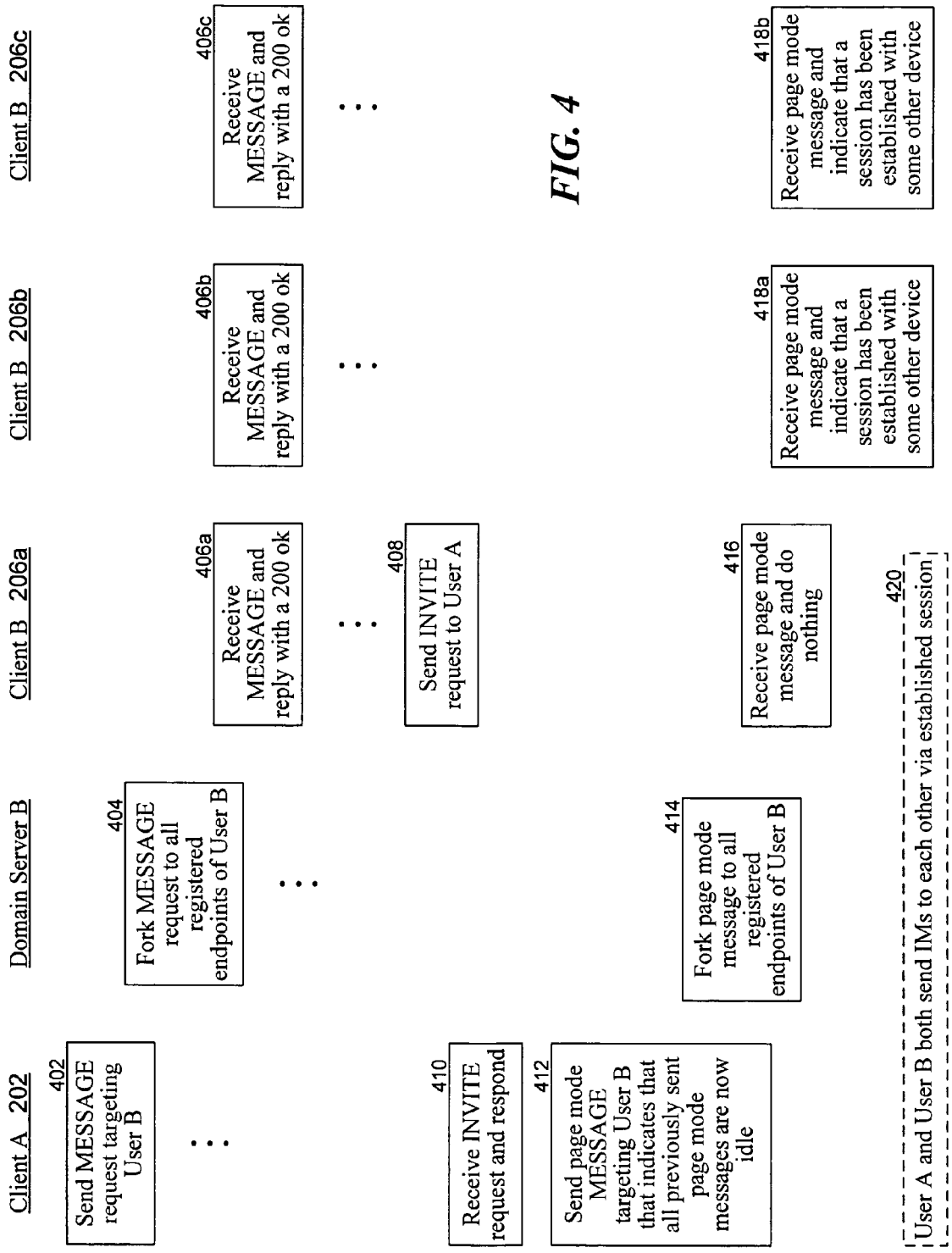
FIG. 4 is a flow diagram showing a method by which an IM mixed mode operation is provided using the Session Initiation Protocol (SIP), according to some embodiments.

FIG. 4 is a flow diagram showing a method by which an IM mixed mode operation is provided using the SIP, according to some embodiments. In particular, the IM mixed mode operation is provided by incorporating both SIP MESSAGE requests to perform page mode messaging and SIP INVITE requests to establish Message Session Relay Protocol (MSRP) or other session based messaging into an IM conversation. SIP is defined in Internet Engineering Task Force (IETF) Request for Comments (RFC) 2543, which is hereby incorporated by reference in its entirety. IETF RFC 3428 is instructive with respect to SIP MESSAGE requests to perform page mode messaging, and is hereby incorporated by reference in its entirety. IETF RFC 3261 is instructive with respect to the offer/answer model using INVITE, and is hereby incorporated by reference in its entirety.

By way of example, a User A at client A 202 wishes to send an IM to User B. At step 402, client A 202 does not know which specific device to target the IM to, and thus, sends a MESSAGE request which targets User B. The MESSAGE request contains a device identifier, such as a globally Routable User Agent URI (GRUU) in the SIP, of the sender, client A 202. The MESSAGE request does not contain a device identifier of a device for User B.

At step 404, Domain Server B, which homes User B registrations, receives and inspects the MESSAGE request. Seeing that no device is targeted—e.g., no endpoint identifier parameter for User B is present—Domains Server B forks the request to all registered endpoints of User B. At steps 406*a-c*, all of User B's registered devices receive and respond to the MESSAGE request with a SIP 200 OK response. In some embodiments, Domain Server B receives and aggregates the 200 OK responses, and sends one 200 OK response to client A 202. User A can send one or more IMs before User B replies for the first time. For each additional IM sent, steps 402, 404, and 406*a-c* are repeated reusing the same device identifier.

Subsequently, User B wishes to send a reply. User B chooses an endpoint to reply from, types a response and sends it. As depicted in FIG. 4, User B may have chosen client B 206*a* as the endpoint to reply from. In this instance, at step 408, client B 206*a*, seeing that the device identifier is available for the remote party initiates a dialogue with the remote party. In particular, client B 206*a* sends an INVITE request to establish MSRP, or other session based messaging, to User A targeting client A 202, which is the device used by User A to send the initial message or messages. The INVITE request contains the device identifier for client A 202, which was contained in the previous MESSAGE request. The INVITE request also contains the device identifier of client B 206*a*.

At step 410, client A 202 receives and responds to the INVITE request from client B 206*a*, thus establishing a session for the IM between client A 202 and client B 206*a*. Subsequent to responding to the INVITE request, client A 202 sends another MESSAGE request or other SIP request type, which targets User B at step 412. In particular, the MESSAGE request or SIP request type indicates that all page mode messages sent previously are now idle as a device has been selected for the particular IM. In one embodiment, the MESSAGE request or SIP request type is automatically generated by the device—i.e., client A 202. At step 414, Domain Server B receives and forks the MESSAGE request to all registered endpoints of User B in a manner similar to that of step 404.

At step 416, client B 206*a*, being the endpoint selected by User B, receives and ignores the MESSAGE request. At step 418*a*, client B 206*b* receives the MESSAGE request and indicates that the IM session has been established at some other device. Likewise, at step 418*b*, client B 206*c* receives the MESSAGE request and indicates that the IM session has been established at some other device. In one embodiment, clients B 206*b* and 206*c* may remove a messaging window containing the previously received messages that was being displayed on a coupled display device.

At step 420, as indicated by the dotted or dashed box, User A and User B both send IMs to each other using their respective devices. For a subsequent IM message sent by User A to User B, client A 202 determines that a session exists between itself and User B's endpoint, client B 206*a*, and sends the IM message in the established session. Likewise, for a subsequent IM message sent by User B to User A, client B 206*a* determines that a session exists between itself and User A's endpoint, client 202, and sends the IM message in the established session.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-readable medium whose contents cause a computer to:
   - initiate an instant messaging (IM) connectivity for an IM conversation initially in page mode IM, the IM conversation being between an originating user and a remote user, the remote user being logged into multiple endpoints;
   - receive a reply to the IM conversation in page mode IM from the remote user, the reply including an identifier of an endpoint used by the remote user to reply to the IM conversation;
   - discover an identity of the endpoint used by the remote user to reply to the IM conversation, the identity of the endpoint being discovered based on the identifier received from the remote user; and
   - convert the IM conversation from page mode IM to session based IM upon discovering the identity of the endpoint, the IM conversation being converted by:
     - transmitting to the endpoint used by the remote user a request to establish a session based IM, and
     - transmitting to the remote user a message in page mode IM, wherein the message indicates that all previous messages transmitted in page mode IM are idle, wherein the message does not specify a particular endpoint of the remote user, and wherein the message is transmitted to each of the multiple endpoints at which the remote user is logged in.

2. The computer-readable medium of claim 1, wherein the page mode IM is established using SIP.

3. The computer-readable medium of claim 2, wherein the page mode IM is established using a MESSAGE request in SIP.

4. The computer-readable medium of claim 1, wherein the session based IM is established using SIP.

5. The computer-readable medium of claim 4, wherein the session based IM is established using an INVITE request in SIP.

6. The computer-readable medium of claim 1 further comprising contents that cause the computer to, subsequent to converting the IM conversation to session based IM, send an indication to one or more endpoints of the remote user that a session has been established with a different endpoint of the remote user.

7. The computer-readable medium of claim 1, wherein the identity of the endpoint used by the remote user is discovered via receipt of a request to establish a dialogue.

8. The computer-readable medium of claim 7, wherein the request to establish a dialogue is made via an INVITE request in SIP.

9. A method in a computing system for providing mixed mode instant messaging (IM), the method comprising:
initiating an IM conversation between an originating user and a remote user initially in page mode IM, the originating user being registered with an IM service at an originating device and the remote user being registered with an IM service at a plurality of remote devices, the IM conversation being initiated by:
transmitting an initiating IM message in page mode IM from the originating user to the remote user, the initiating IM message being transmitted from the originating device to each of the plurality of remote devices at which the remote user is registered;
receiving a reply from the remote user, the reply comprising a reply IM message in page mode IM and an identifier of a remote device used by the remote user to reply to the initiating IM message, the remote device being one of the plurality of remote devices at which the remote user is registered;
discovering an identity of the remote device used by the remote user to reply to the initiating IM message, the identity of the remote device being discovered based on the identifier of the reply; and
subsequent to discovering the identity of the remote device used by the remote user to reply to the initiating IM message, converting the IM conversation from page mode IM to session based IM, the IM conversation being converted by:
transmitting a request from the originating user to the remote user to convert the IM conversation to a session based IM, the request being transmitted from the originating device to the remote device used by the remote user, and
transmitting an expiration IM message in page mode IM from the originating user to the remote user, wherein the expiration IM message indicates that all previous messages transmitted in page mode IM have expired, wherein the expiration IM message does not specify a particular endpoint of the remote user, and wherein the expiration IM message is transmitted to each of the plurality of remote devices at which the remote user is registered.

10. The method of claim 9 further comprising, subsequent to converting the IM conversation from page mode IM to session based IM, notifying the plurality of remote devices of the conversion to session based IM.

11. The method of claim 9, wherein the page mode IM is converted to session based IM via a request to establish a session sent by the remote device used by the remote user to initially reply to the IM conversation to the originating device.

12. The method of claim 11, wherein the request is an INVITE request in SIP.

13. The method of claim 9, wherein the page mode IM is converted to session based IM via a request to establish a session sent by the originating device to the remote device used by the remote user to initially reply to the IM conversation.

14. The method of claim 9, wherein the discovering the identity of one of the plurality of remote devices used by the remote user to initially reply to the IM conversation comprises the remote device used by the remote user to initially reply to the IM conversation sending its identity to the originating device.

15. A method in an originating endpoint of an originating user for establishing an instant messaging (IM) session between the originating endpoint of the originating user and a remote endpoint of a remote user, when the remote user is logged into multiple remote endpoints and it is not known at which of the multiple remote endpoints the remote user is located, the originating endpoint and the remote endpoint being computer systems with processors, the method comprising:
transmitting a first page mode message from the originating endpoint to the remote user, wherein the first page mode message does not specify a particular remote endpoint, and wherein the first page mode message is transmitted to each of the multiple remote endpoints at which the remote user is logged in;
receiving at the originating endpoint a reply message from a remote endpoint, wherein the reply message comprises a second page mode message that is transmitted from the remote endpoint at which the remote user is located to the originating endpoint, wherein the reply message includes an endpoint identifier of the remote endpoint at which the remote user is located, and wherein the remote endpoint at which the remote user is located is one of the multiple remote endpoints at which the remote user is logged in;
transmitting a session mode message from the originating endpoint to the remote user, wherein the session mode message specifies the endpoint identifier of the remote endpoint at which the remote user is located, and wherein the session mode message is transmitted only to the remote endpoint at which the remote user is located and not to other remote endpoints at which the user is logged in; and
transmitting a third page mode message from the originating endpoint to the remote user, wherein the third page mode message indicates that all previously transmitted page mode messages are idle, wherein the third page mode message does not specify a particular remote endpoint, and wherein the third page mode message is transmitted to each of the multiple remote endpoints at which the remote user is logged in.

16. The method of claim 15 wherein the method further comprises, after transmitting the session mode message from the originating endpoint to the remote user,
determining that a session has been established between the originating endpoint and the remote endpoint at which the remote user is located; and
transmitting a subsequent session mode message in the established session, wherein the subsequent session mode message is transmitted from the originating endpoint to the remote endpoint at which the remote user is located and not to the other remote endpoints at which the user is logged in.

* * * * *

UNITED STATES PATENT AND TRADEMARK OFFICE
CERTIFICATE OF CORRECTION

| | | |
|---|---|---|
| PATENT NO. | : 7,725,553 B2 | Page 1 of 1 |
| APPLICATION NO. | : 10/990031 | |
| DATED | : May 25, 2010 | |
| INVENTOR(S) | : Timothy J. Rang et al. | |

It is certified that error appears in the above-identified patent and that said Letters Patent is hereby corrected as shown below:

In Title page, in Item (54), under "Title" column 1, line 1, delete "MASSAGING" and insert -- MESSAGING --, therefor.

In column 1, line 1, delete "MASSAGING" and insert -- MESSAGING --, therefor.

Signed and Sealed this
Seventeenth Day of May, 2011

David J. Kappos
*Director of the United States Patent and Trademark Office*